United States Patent
Cicerone (10) Patent No.: US 9,280,532 B2
(45) Date of Patent: Mar. 8, 2016

(54) SYSTEM AND METHOD FOR ACCESSING RICH OBJECTS VIA SPREADSHEETS

(75) Inventor: Derek Michael Cicerone, New York, NY (US)

(73) Assignee: Palantir Technologies, Inc., Palo Alto, CA (US)

( * ) Notice: Subject to any disclaimer, the term of this patent is extended or adjusted under 35 U.S.C. 154(b) by 281 days.

(21) Appl. No.: 13/196,788

(22) Filed: Aug. 2, 2011

(65) Prior Publication Data
US 2013/0036346 A1    Feb. 7, 2013

(51) Int. Cl.
G06F 17/24    (2006.01)
G06F 17/27    (2006.01)

(52) U.S. Cl.
CPC ............ *G06F 17/246* (2013.01); *G06F 17/276* (2013.01)

(58) Field of Classification Search
CPC ... G06F 17/211; G06F 17/245; G06F 17/246; G06F 17/25; G06F 17/276
USPC .......................... 715/212, 215, 217, 219, 220
See application file for complete search history.

(56) References Cited

U.S. PATENT DOCUMENTS

| | | | | |
|---|---|---|---|---|
| 5,632,009 | A * | 5/1997 | Rao et al. | 715/201 |
| 5,845,300 | A | 12/1998 | Comer | |
| 6,779,151 | B2 * | 8/2004 | Cahill et al. | 715/210 |
| 7,451,397 | B2 * | 11/2008 | Weber et al. | 715/267 |
| 7,941,321 | B2 * | 5/2011 | Greenstein et al. | 705/1.1 |
| 8,046,283 | B2 * | 10/2011 | Burns et al. | 705/35 |
| 2002/0095658 | A1 | 7/2002 | Shulman | |
| 2004/0153418 | A1 * | 8/2004 | Hanweck | 705/67 |
| 2004/0205524 | A1 * | 10/2004 | Richter et al. | 715/503 |
| 2007/0192265 | A1 * | 8/2007 | Chopin et al. | 706/20 |
| 2009/0319418 | A1 * | 12/2009 | Herz | 705/37 |

FOREIGN PATENT DOCUMENTS

EP    1672527  A2    6/2006

OTHER PUBLICATIONS

Vose et al., "Help File for ModelRisk Version 5", 2007, Vose Software, pp. 349-353.*
Bluttman et al., Excel Formulas and Functions for Dummies, 2005, Wiley Publishing, Inc., p. 280, 284-286.*
International Search Report for application EP12179096 dated Mar. 13, 2013.
European Patent Office, "Office Action" in application No. 12 179 096.8-1507, dated Jul. 3, 2014, 5 pages.
Claims in European Application No. 12 179 096.8-1507, dated Jul. 2014, 2 pages.

* cited by examiner

*Primary Examiner* — Kyle Stork
*Assistant Examiner* — Seung Jung
(74) *Attorney, Agent, or Firm* — Hickman Palermo Becker Bingham LLP (57) ABSTRACT

One embodiment of the present invention sets forth a method for providing access to a data object from within a spreadsheet included in a spreadsheet application. The method includes associating the data object with a first cell of the spreadsheet, wherein the data object is related to a parameter, and the first cell is identified by a cell reference, receiving an input that is related to a second cell of the spreadsheet and includes an expression that specifies the parameter and the first cell reference, and replacing the first cell reference specified by the expression with the data object, wherein a value for the second cell may be determined by applying the parameter to the data object specified in the expression.

23 Claims, 6 Drawing Sheets

SYSTEM AND METHOD FOR ACCESSING RICH OBJECTS VIA SPREADSHEETS

BACKGROUND OF THE INVENTION

1. Field of the Invention

The present disclosure relates generally to data access and analysis and, more specifically, to a system and method for accessing rich objects via spreadsheets.

2. Description of the Related Art

A spreadsheet application is a data organization tool that allows users to store and organize large amounts of data. In addition, a spreadsheet application allows users to perform various analyses on the data stored in the spreadsheet, including mathematical and statistical analyses. A spreadsheet is typically organized as a series of rows and columns, where a particular intersection of a row and a column is referred to as a cell and holds a unit of data. A common feature of a spreadsheet application is to allow a user to reference a particular cell in an expression that is evaluated to provide a value for a different cell.

Spreadsheet applications are commonly used to manage and analyze financial data. However, raw financial data is typically quite large with many dependencies, and inputting such data into a spreadsheet as well as analyzing such data within a spreadsheet is quite cumbersome and error prone. In addition, some types of raw financial data do not fit well into the row/column organization offered by a spreadsheet and cannot be visualized easily in such an organization. Further still, financial analysis is often quite complex, where an expression typically references multiple cells (often on the order of hundreds of thousands), making the process quite error prone. Since the expressions are often so complex, locating the source of an error is extremely difficult and time consuming.

As the foregoing illustrates, what is needed in the art is a mechanism for providing data in a spreadsheet that can be accessed and analyzed in an efficient and less error prone manner.

SUMMARY OF THE INVENTION

One embodiment of the present invention sets forth a method for providing access to a data object from within a spreadsheet included in a spreadsheet application. The method includes associating the data object with a first cell of the spreadsheet, wherein the data object is related to a parameter, and the first cell is identified by a cell reference, receiving an input that is related to a second cell of the spreadsheet and includes an expression that specifies the parameter and the first cell reference, and replacing the first cell reference specified by the expression with the data object, wherein a value for the second cell may be determined by applying the parameter to the data object specified in the expression.

Advantageously, being able to access and analyze data objects related to financial data from within a spreadsheet application enables users to perform complex data entry and analysis operations in an efficient manner.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
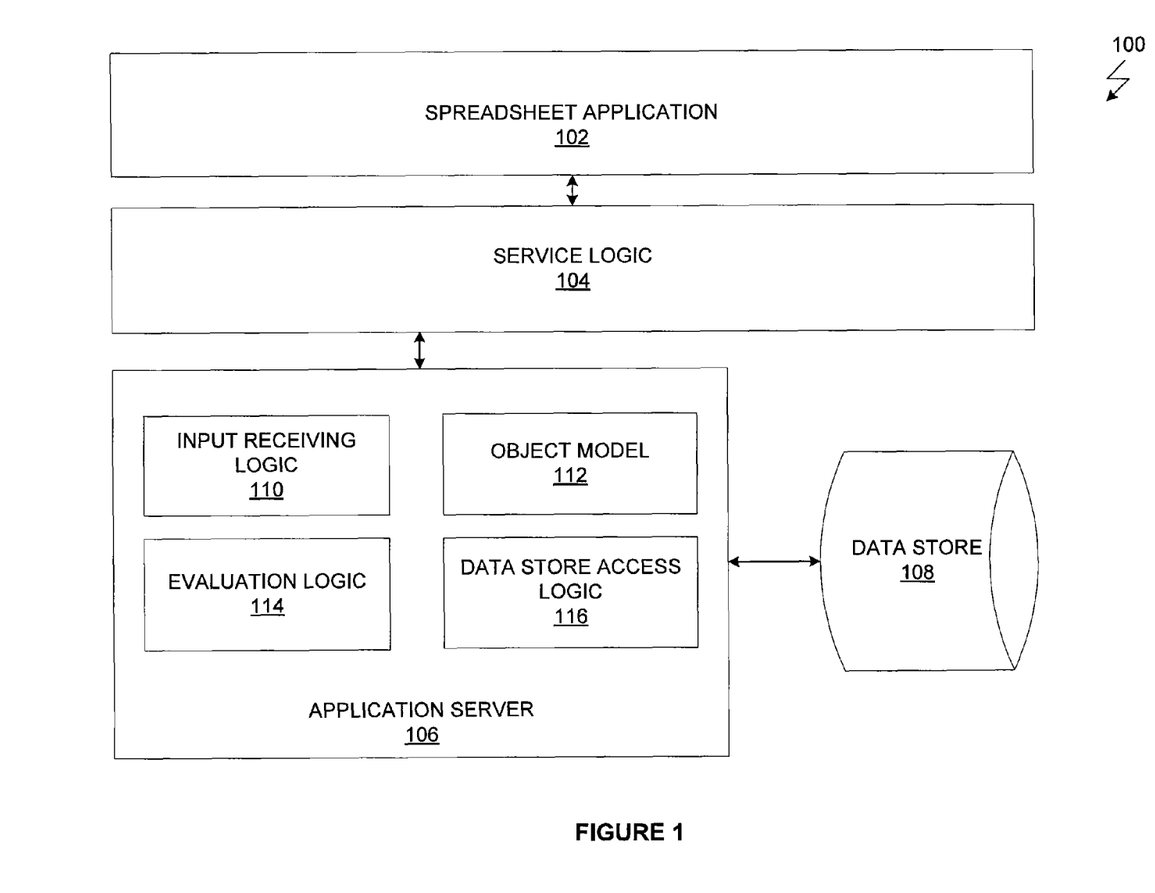
FIG. 1 illustrates a system that enables a spreadsheet application to reference rich objects, according to one embodiment of the invention.

FIG. 1 illustrates a system 100 that enables a spreadsheet application to reference rich objects, according to one embodiment of the invention. As shown, the system 100 includes a spreadsheet application 102, service logic 104, an application server 106 and a data store 108.

The spreadsheet application 102 is a software program that allows a user to create, analyze and interact with different spreadsheets each having one or more worksheets. A worksheet typically includes a two-dimensional matrix or grid having multiple rows and columns. Each cell, at a particular row and a particular column, includes data, such as alphanumeric text, numeric values or a formula. A formula defines how the data associated with a particular cell is to be calculated from the data included in another cell (or a combination of cells) each time any cell is updated. Spreadsheets are configured to re-calculate each dependent cell after a change is made to a particular cell.

The service logic 104 is an infrastructure layer that, among other things, allows the spreadsheet application 102 to communicate with the application server 106. In one embodiment, the service logic 104 includes a messaging service (not shown) that allows the spreadsheet application 102 and the application server 106 to communicate asynchronously via messages.

The application server 106 includes logical elements such as input receiving logic 110, an object model 112, evaluation logic 114 and data store access logic 116. The application server 106 may be implemented as a special-purpose computer system having the logical elements shown in FIG. 1. In one embodiment, the logical elements comprise program instructions stored on one or more machine-readable storage media. Alternatively, the logical elements may be implemented in hardware, firmware, or a combination thereof.

The input receiving logic 110 receives inputs from different applications executing within the system 100, such as the spreadsheet application 102, via the service logic 104. Inputs include, but are not limited to, processing requests, data access/storage requests and expression evaluation requests. The input receiving logic 110 transmits requests received from the different applications to logical elements within the application server 106 that are configured to process those requests.

The object model 112 is a model that specifies a universe of data objects, relationships between the data objects, higher-order data objects generated based on one or more zero-order data objects in the universe, higher-order data objects generated based on other higher-order data objects, and auxiliary entities related to the universe of data objects. The data objects may be created by users via data object creation mechanisms exposed in different applications, such as the spreadsheet application 102. In one embodiment, the object model 112 includes only references to the data objects and data related to those data objects is stored within the data store 108. Below are some examples of different data objects that are included in the object model 112. Persons skilled in the art would understand that any other data objects can be included in the object model 112.

Examples of Zero-Order Data Objects

Instruments: An instrument is a data object that represents any market traded entity or product of interest, such as a stock (equity), bond, currency, or fund.

Metrics: A metric is a transformation (or function) that receives one type of data (e.g., an object such as an instrument) and returns another type (e.g., another object such as a time series). A metric may perform any form of specified processing, specified computation, related operations such as database queries, network communications and data storing. For example, a metric may receive a particular instrument as input and return a time series of the particular instrument's volume. A metric may also receive one time series for an instrument and return the value of the instrument on a given day. A metric may optionally receive parameters at runtime that influence the execution of logic implemented in the metric. An example of a parameter that can be inputted into a metric to influence the execution of a metric may be a number of days to show a moving average price for MSFT where the metric calculates the moving average price.

Objects that are of a higher order than a zero order can be built using metrics. The input objects and the output objects can be zero-order or higher-order in any combination. The data changes over time. Therefore, if a metric is evaluated at two different times, it may produce different outputs. Alternatively, output objects from one or more of these metrics may be pre-computed/evaluated and stored/cached beforehand. In some embodiments, parameters may be provided to a metric to specify whether a cached object of a metric should be used as input, or whether the output of a metric should be cached or stored.

Time Series: A time series is a programmatic object that represents time-dependent information in any of several forms, including a series of discrete dates or a sequence of time-related values. Where an object model contains a large amount of time-dependent information, many time series may be created in the process of evaluating objects in the object model. For example, an instrument may have a trading history that indicates its values over a period of time. From this trading history (e.g., raw trading data), one or more time series may be created to represent time-dependent information, in any desired resolution (for example, in a time scale of years, months, weeks, days, hours, minutes, seconds).

In some embodiments, a time series may comprise a set of numeric values and a separate set of time values, wherein each numeric value has a corresponding time value in the set of time values. Each such numeric value represents a value of a certain entity at each corresponding time value in the set of time values. For example, a time series may be used to represent market values of an instrument. The above-mentioned "value of a certain entity" may be a particular market value at the closing of a trading day. In this example, the time series may comprise a set of long or double values, each of which represents a market value at the closing of a corresponding day as indicated by a time value in a separate set of time values. The time series further comprises the separate set of time values representing the closings of all corresponding days, for which market values of the instruments are included in the set of long or double values.

A time series may also be used to represent values of an entity for time values that meet certain criteria. For example, a time series may be used to represent market values for an instrument when the instrument is traded to higher prices, when the instrument is traded to lower prices, when the volatility of the instrument exceeds a certain limit, when the volatility of the instrument stays below a certain limit, or a derivative of other time series. Furthermore, the values of an entity are not limited to market values of an instrument. For example, the values of an entity, as represented by a time series, may comprise analytical values of historical volatility of two instruments.

In some embodiments, a time series associated with an instrument may be accessed by an expression containing an identifier (e.g., the identifier "GOOG" to indicate the equity instrument for Google, Inc.) for another object such as an instrument and a token (e.g., a textual name such as "HVOL" representing historical volatility of an instrument) for a type of transformation. In the present example where the time series is accessed by the expression "GOOG.HVOL", the metric identified by the token (e.g., "HVOL") receives the identifier for the instrument (e.g., "GOOG") as input and transforms raw trading data of the instrument (i.e., "GOOG") into a time series as an output object. This time series, for example, may represent time-dependent information of volatility of the instrument "GOOG" in all recorded trading days.

A time series can not only represent time-dependent information for zero-order objects such as instruments, but may also represent time-dependent information for any higher-order objects in the object model.

In some embodiments, a time series may be used to represent time-dependent information that is not related to another object. For example, a set of time values from a calendar, e.g., all week days, all work days, all Mondays, or the second days of months, may be transformed by a metric into a time series. Such a time series may be viewed as an object per se as it is independent of another object such as an instrument. In some embodiments, the time series may be accessed within a global scope, by any other objects, without naming any other object such as an instrument. In some embodiments, a time series may comprise a set of time values (e.g., all Mondays) without including a separate set of numeric values representing values of an entity that may be associated with another object such as an instrument.

Example Higher-Order Data Objects

Date Set: A date set comprises a set of time values that satisfy one or more selection criteria. As used herein, the term "time value" may include date and/or time of day information at various resolutions, for example, from multiple years to sub-seconds. For example, a date set may be all trading days when the "GOOG" stock trades up. A date set may also have an explicit start time value for the set, for example, Jan. 1, 2006; thus, the date set excludes all time values that are before the explicit start time value. Similarly, a date set may also have an explicit end time value; thus, the date set excludes all time values that are after the explicit end time value.

A date set may also take an implicit start time value, where an explicit start time value is not specified. For example, a date set that comprises all days when the "GOOG" stock trades up may have an implicit start time value when the "GOOG" stock was first publicly traded. Similarly, a date set may also take an implicit end time value, where an explicit end time value is not specified. For example, a date set that comprises all days when the "ENE" stock was available for trades may have an implicit end time value when the "ENE" stock was terminated from public trading from the New York Stock Exchange.

One of several object creation mechanisms may be used to create higher-order objects such as date sets. One object creation mechanism is a metric. This metric may take a first input that specifies a time series. This time series is generally a set of date/value pairs. The date set metric also may take a second input that specifies one or more criteria. For example, the one or more criteria as specified in the second input may specify a range. The resulting date set will then contain all the dates as indicated by the time series that are within the specified range.

Another object creation mechanism to create a higher-order object such as a date set is to directly use a programming language such as JAVA. The user may supply programming language code to the system 100, which may be compiled, interpreted or otherwise executed by the system 100 to create a date set. Extension mechanisms such as Java reflection may be used to add code segments or objects to the system so that the object creation mechanisms can be dynamically extended.

Yet another object creation mechanism to create a higher-order object such as a date set is to interact with a user interface. For example, tools or widgets may be provided in or through a graphical user interface and may interact with the user for the purpose of creating a date set.

In various embodiments, these and other object creation mechanisms, or a combination thereof, may be used to create various higher-order objects.

Index: An index indicates a collective value of one or more instruments as a function of time over a set of time values. A collective value is any type of aggregate value of the one or more instruments. The collective value may be of a market value type such as a total monetary value of the one or more instruments traded at public exchanges, or of an analytical value type such as a numeric value indicating volatility of the trading price for the one or more instruments, as a function of time over the set of time values.

For the purpose of illustration only, the one or more instruments included in the index may comprise the "GOOG", "YHOO", and "MSFT" stocks. Hence, the index may be an aggregate market value of these stocks, as a function of time over all trading days since Jan. 1, 2011. A market value is an aggregation of values of all assets included in the portfolio at a corresponding time value in the set of time values. The market value may be measured (e.g., denominated) in a reference currency such as the U.S. dollar. For example, a value of an asset such as an instrument may be a trading price of that instrument at the closing of a particular trading day. A value of the reference currency may be its trading value as denominated in the reference currency. A value of a currency that is not the reference currency may also be measured in the reference currency through an exchange rate.

An index may have a start time value, for example, Jan. 1, 2011; thus, the index does not track the collective value before the start time value. Similarly, an index may also have an end time value; thus, the index does not track the collective value after the end time value. The start time value and/or the end time value may be explicit or implicit.

To create an index, any of the object creation mechanisms may be used. An object creation mechanism may take a first input that specifies one or more time series for the one or more instruments. For example, these time series as specified in the first input may represent trading prices for the "GOOG", "YHOO", and "MSFT" stocks on all trading days when the stocks are publicly traded. The object creation mechanism also may take a second input that specifies a date set. In some embodiments, the date set as specified in the second input may specify a set of days for which a collective value of the one or more instruments should be tracked. For example, the date set may comprise a set of last five trading days of each quarter since Jan. 1, 2011. The object creation mechanism may comprise logic to compute the collective value of the one or more instruments as specified in the first input over the set of time values as specified in the second input. The object creation mechanism may create and output an index in the form of a new time series. Each numeric value in the set of longs or doubles indicates the collective value of the "GOOG", "YHOO", and "MSFT" stocks at a time value (e.g., a day) in the set of last five trading days of each quarter since Jan. 1, 2011.

The user may provide a token in the form of a string to name the index so that the definition or computed value of the index can be subsequently referenced as a named object in combination with other objects. In an embodiment, any of all the entities that are involved in specifying, creating and outputting a new index may be stored or cached in a machine-readable storage medium. In addition, the definition of new index may also be stored or cached in such a medium.

Instrument Group: An instrument group comprises one or more instruments selected from a universe of instruments using a filter chain that is created from zero or more set operations and one or more filter links. For example, an instrument group may comprise all the stocks in the S&P Index ("SPX") that are in the technology sector. Another example of instrument group may be all the stocks in the financial sector of the S&P Index that have low PE ratios.

To create an instrument group, an object creation mechanism may be user. This mechanism may take a first input that specifies the zero or more set operations. For example, a set operation of "intersection" may be specified as the first input. The object creation mechanism also may take a second input that specifies the one or more filter links. For the purpose of illustration only, such a filter link may be a criterion that any selected stock must belong to the bucket of lowest 10% among an input set of instruments. In some embodiments, a graphical user interface of a client spreadsheet application may be used to create an instrument group. A filter view may be used to represent an input set of instruments to which a filter link may be applied. In this example, all stocks in the financial sector of the S&P Index are used as an input set of instruments. These stocks are represented in an n-tile diagram. This n-tile diagram comprises n (a positively integer such as ten) buckets, each bucket comprising substantially a same number of instruments. Each bucket represents a particular range of 10% PE ratios. Thus, if a stock is in the top 10% among all the stocks in terms of PE rations, the stock will be included in the bucket between 90% and 100%. Similarly, if a stock is in the bottom 10% among all the stocks in terms of PE ratios, the stock will be included in the bucket between 0% and 10%.

The object creation mechanism may comprise logic to create a filter chain by evaluating each filter link in the filter chain, combining the filter chains based on the set operation specified, and generates the instrument group that comprises the one or more instruments. In the present example, where the filter link is created using an n-tile diagram, the object creation mechanism may create and output an instrument group that comprises a set of instruments that are in the bottom 10% of PE ratios.

The user may provide a token in the form of a string to name the instrument group. For example, this instrument group may be called "low PE SPX Financials." In some embodiments, a text input box may be provided in graphical user interface to accept input of the string. Subsequently, this named instrument group may be used in combination with other objects by a reference to the token.

In an embodiment, any of all the entities that are involved in specifying, creating and outputting a new instrument group may be stored or cached in a machine-readable storage medium. In addition, the new instrument group may also be stored or cached in such a medium.

Portfolio: A portfolio indicates a market value of included assets as a function of time over a set of time values. A portfolio may comprise a start time value from which the market value of the portfolio is to be tracked. A portfolio may optionally comprise an end time value after which the market value of the portfolio is no longer tracked. The set of assets included in the portfolio at any given time value may comprise a variable number of instruments. The set of assets may optionally include a certain amount in various currencies (including currency equivalents).

To create a portfolio, an object creation mechanism may be used. This mechanism may take a first input that specifies zero or more time series for the zero or more instruments. For example, these time series as specified in the first input may represent trading prices for the "GOOG", "YHOO", and "MSFT" stocks on all trading days when the stocks are publicly traded. In some embodiments, the object creation mechanism may use weight factors to determine how much of each of these instruments is to be hold in the portfolio at each time value of a time period starting from the start time value. The object creation mechanism also takes a second input that specifies a date set. In some embodiments, the date set as specified in the second input specifies a set of time values (e.g., the preceding time period) for which a market value of the portfolio should be computed. For example, the date set may comprise a set of all trading days since Jan. 1, 2011. The object creation mechanism may further take a third input that specifies the one or more trades over the set of time values as specified in the second input. Each trade may specify an instrument, a buy-or-sell indication, a time of trading, and a quantity. The object creation mechanism may comprise logic to execute, or to simulate execution of, trades as specified in the third input and to compute the market value of the portfolio over the set of time values as specified in the second input, thereby giving rise to a new portfolio object. Any other metric may be applied to the new portfolio object to extract information. In addition, the portfolio object may be used to create another higher-order object. In the present example, the associated set of time values to which the long or double values are mapped is the set of time values specified in the second input. For example, each numeric value in the set of longs or doubles indicates a collective market value of all assets in the portfolio at a time value in the set of all trading days since Jan. 1, 2011.

The user may provide a token in the form of a string to name the portfolio so that a subsequent reference can be made to the token in an expression that involves other objects.

In an embodiment, any of all the entities that are involved in specifying, creating and outputting a new portfolio may be stored or cached in a machine-readable storage medium. In addition, the new portfolio may also be stored or cached in such a medium.

Strategy: A strategy may be used to generate a net profit in a time period. A net profit in a time period is a net gain or loss at the end of the time period. Here, the net profit may be determined by a number of trades executed within the time period and market conditions. A block of strategy code may be used to generate the trades that are to be executed in connection with the strategy. In some embodiments, the net profit and the trades may be hypothetical and generated for the purpose of studying, validating or invalidating a particular trading strategy.

The time period may be represented by a date set that comprises a starting time value corresponding to the beginning of the time period and optionally an end time value corresponding to the end of the time period.

In some embodiments, a strategy comprises an initial collection of assets at the beginning of the time period. In a particular embodiment, this initial collection of assets may comprise only a starting net asset value in a reference currency such as the U.S. dollar.

To create a strategy, an object creation mechanism may be used. This object creation mechanism may take a first input that specifies a particular date set. Comprising a start time value and optionally an end time value as previously described, the particular date set represents a time period where trades may be generated and executed. For example, the date set may be all trading days from Jan. 1, 2006 to now. Alternatively, the date set may be all trading days when the "GOOG" stock trades up.

The object creation mechanism may take a second input that specifies a statement block, which when executed generates one or more trades. Each trade may specify an instrument, a-buy-or-sell indication, a time of trading, and a quantity. The object creation mechanism may comprise logic to execute, or to simulate execution of, the statement block and the trades as generated by the statement block and to compute the market value of the strategy over the set of time values as specified in the first input, thereby creating a new strategy object. Any other metric may be applied to the new strategy object to extract information. In addition, the strategy object may be used to create another higher-order object. Furthermore, the object creation mechanism may create and output a net profit at the end of the time period. In the present example, the object creation mechanism may create and output a net profit of 72,277.21 in the reference currency of US dollar.

The user may provide a token in the form of a string to name the strategy. For example, the strategy may be named as "VLD during rising rates. Subsequently, this strategy may be used to create other higher-order objects.

In an embodiment, any of all the entities that are involved in specifying, creating and outputting a new strategy may be stored or cached in a machine-readable storage medium. In addition, the new strategy may also be stored or cached in such a medium.

Regression: A regression may be used to perform predictions, inferences and hypothesis analyses between independent time series and a dependent time series in the object model.

To create a regression, an object creation mechanism may be used. This object creation mechanism may take a first input that specifies one or more first time series representing independent variables in a regression analysis. For example, the one or more first time series may be ones that are associated with objects like "Exxon Mobil Corp", "WTI CRUDE FUTURE (1st month generic)", and "S&P 500 INDEX" in the object model. The object creation mechanism also may take a second input that specifies a second time series representing a dependent variable in the regression analysis. The object creation mechanism may comprise logic to perform the regression analysis that transforms the one or more first time series into a predicted time series and compares the predicted time series with the second time series, thereby creating a new regression object. This new regression object may be used in part by another object creation mechanism to create other higher-order objects.

The user may provide a token in the form of a string to name the regression. Subsequently, this regression may be used in combination with other objects through a reference to its token.

In an embodiment, any of all the entities that are involved in specifying, creating and outputting a new regression may be stored or cached in a machine-readable storage medium. In addition, the new regression may also be stored or cached in such a medium.

A user may define an arbitrarily complex object that is built on top of other objects. For example, liquidity and risk models may be built as a multi-level object on top of an instrument group, a portfolio, several indexes, a date set, etc. Similarly, an index may be built on top of other higher-order objects. In some embodiments, a higher-order object may be represented as a tree. The leaf nodes of the tree are zero-order objects such as instruments. The tree may additionally and/or optionally contain non-leaf nodes. The non-leaf nodes are higher-order objects. In other words, a higher-order object may be built from building blocks. These building blocks may be zero-order or higher-order objects. For example, when an index is built from an instrument group, the instrument group also may be built from a combination of other higher-order and zero-order objects.

Any of several object creation mechanisms may be selected by a user for the purpose of creating a higher-order object. Definitions for the higher-order objects may be generated by the object creation mechanism and saved in the system. A definition may be defined and evaluated at two different times. The results of evaluation of a definition may change as underlying data changes. These results may be saved in cache or in permanent storage.

In accordance with an embodiment of the present invention, an input mechanism is provided for a user to enter expressions to the application server 106 for the purpose creating, modifying, deleting, evaluating, or saving various objects and components in the object model. Here, the term "input mechanism" includes either a command line interaction mechanism or a graphic-user-interface based interaction mechanism, or a combination of the preceding two. In other embodiments, an input mechanism is not used and objects may be specified programmatically or at runtime using other mechanisms.

An expression may comprise one or more tokens separated by delimiter characters such as a period, parentheses, a comma, quotation marks, etc. Each token may refer to an economic index, an instrument, a metric, an input object, an output object, a parameter, a time series, a higher-order-object, or any higher-order object in the object model.

The evaluation logic 114 receives expression evaluation requests from applications, such as the spreadsheet application 102, via the input receiving logic and evaluates the expressions specifies in those requests. An expression typically includes a reference to one or more data objects included in the object model 112 and specifies one or more operations to be performed on those data objects. The evaluation logic 114, when processing a particular expression, may create, modify, delete and store data objects that are associated with the universe of data objects included in the object model 112. In addition, the evaluation logic 112 the evaluation logic 112 transmits the results of processing the particular expression to the application that transmitted the expression evaluation request.

An expression may be evaluated with a certain order. For example, in a particular embodiment, the expression may be evaluated according to a precedence ordering among operators. Additionally and/or optionally, certain optimization logic may be used to determine whether any tokens in an expression can be evaluated in parallel.

In an embodiment that uses a modeling language, a user may type an expression "(HVOL( )+IVOL( )/2" to define a new custom metric. For the purpose of illustration only, "HVOL( )" and "IVOL( )" may be two tokens for two functions. Tokens for other constructs may also be used. The user may give a new token "avgvol( )" for this new metric. Subsequently, the token "avgvol( )" for the new metric may be displayed as a selectable item in a dialog pane. This new metric may be used together with an instrument such as "GOOG" to cause a new time series to be created and displayed. This new time series is produced by averaging values from two time series as specified by "HVOL( )" and "IVOL( )".

The application server 106 may immediately make available this new type of object (e.g., a new function "avgvol( )") to all users of the system. The users simply specify the token associated with the new type of object in subsequent expressions. The time series representing "HVOL( )" and "IVOL( )" can be displayed in a content pane, along with a new time series as specified by the new token (i.e., "avgvol( )").

In this manner, new types of objects and new types of expressions can be continuously added to the object model 112, which causes the object model 112 to evolve over the time. For example, a user may continuously define new hypotheses as new object types or as new instances of existing object types and timely test the new hypotheses in a rapidly changing market. Evaluations of some of these hypotheses may be saved or cached along with the definitions for the hypotheses. These hypotheses can also be recalled, re-studied, and reused by way of suitable tokens at a later time.

In an embodiment, application server 106 comprises data store access logic 116. Data store access logic 116 may comprise a set of program instructions which, when executed by one or more processors, are operable to access and retrieve data from data store 108. For example, data store access logic 116 may be a database client or an Open Database Connectivity (ODBC) client that supports calls to a database server that manages data store 108. Data store 108 may be any type of structured storage for storing data including, but not limited to, relational or object-oriented databases, data warehouses, directories, data files, and any other structured data storage.

Figure 2:
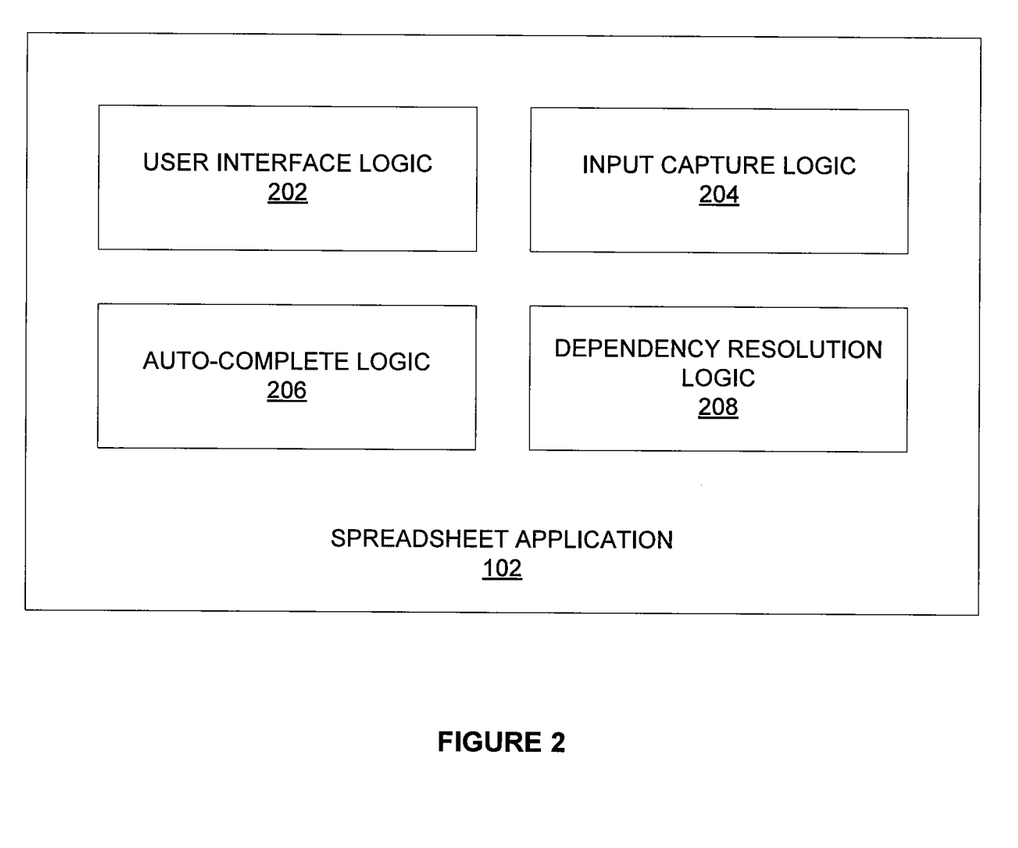
FIG. 2 illustrates a more detailed view of the spreadsheet application of FIG. 1, according to one embodiment of the invention.

FIG. 2 illustrates a more detailed view of the spreadsheet application 102 of FIG. 1, according to one embodiment of the invention. As shown, the spreadsheet application 102 includes user interface logic 202, input capture logic 204, auto-complete logic 206 and dependency resolution logic 208.

The user interface (UI) logic 202 is set of program instructions which, when executed by one or more processors of a computer system, are operable to receive user input and to display a graphical representation of one or more graphic constructs related to creating, analyzing and exploring data objects described above as well as the spreadsheet application 204. The UI logic 202 may be operable to receive user input from, and display the graphic constructs to, a graphical user interface that is provided on a display device coupled to the computer system.

As described previously herein, a spreadsheet typically includes worksheets that are organized as a two-dimensional matrix or grid having multiple rows and columns. Each cell, at a particular row and a particular column, includes data, such as alphanumeric text, numeric values or a formula. A user, via the UI logic 202, inputs data into the cells of a worksheet. The input may include a definition, editing instructions and/or expressions related to one or more data objects described above. In addition, for a particular cell, the user may input an expression that includes a cell reference that identifies a different cell. Consequently, the parameters of the expression can include parameters related to one or more data objects included in the different cell. For example, for a cell "A1", the user may input the data object "GOOG" via the UI logic 202. For a different cell, "B1", the user may input an expression that includes the data object specified by "A1" by inputting "A1.close," where ".close" is a parameter of the data object specified by the cell "A1."

Input provided by a user, via the UI logic 202, for a particular cell is captured by the input capture logic 204 as the user provides the input. The input capture logic 204 transmits the input to the auto-complete logic 206 that is configured to provide suggestions to the user for completing an expression that is partially defined in the input. Continuing the example described above, for cell "A1," as the user inputs "GO," the input capture logic 204 captures the input "GO" and transmits "GO" to the auto-complete logic 206. The auto-complete logic 206 then determines possible suggestions that can be provided to the user to complete the input "GO." To make such a determination, the auto-complete logic 206 transmits request to the application server 106 to retrieve identifiers of different objects in the object model 112 that include the text "GO." Consequently, the identifier of the data object "GOOG," among others, would be returned in response to such a request. The auto-complete logic 206 then, via the UI logic 202, provides these suggestions to the user.

Importantly, the auto-complete logic 206 provides suggestions, not only for data objects, but also for parameters of those data objects, such as variables and functions related to the data object. In addition, the auto-complete logic 206 is identifies data objects associated with a particular cell that is being referenced in an expression. For example, for cell "B1", as the user inputs "A1.," the auto-complete logic 206 is configured to identify that the cell A1 is associated with the data object "GOOG" and provide parameters, such as variables and functions, related to the data object as suggestions to the user. In such a situation, once the auto-complete logic 206 determines that the cell A1 is associated with the data object "GOOG," the auto-complete logic 206 transmits a request to the application server 206 to retrieve the parameters related to the data object "GOOG." The auto-complete logic 206 then, via the UI logic 202, provides these parameters as suggestions to the user.

Once an expression for a particular cell is completely input by the user, the input capture logic 204 transmits the expression to the dependency resolution logic 208. The dependency resolution logic 208, before transmitting the expression to the evaluation logic 114 within the application server 106, determines whether there are any cell references included in the expression. To make such a determination, the dependency resolution logic 208 first parses the expression to identify any references that could potentially be a cell reference. For each such reference, the dependency resolution logic 208 then confirms that the reference is a cell reference and not a different type of reference, such as a reference to a data object. In one embodiment, such a confirmation is based on metadata associated with the expression that identifies the type of a particular reference. Next, for each confirmed cell reference, the dependency resolution logic 208 replaces the cell reference in the expression with a reference to the data object associated with the cell identified by the cell reference. For example, the expression "A1.close" is modified by the dependency resolution logic 208 to replace the cell reference "A1" with a reference to the data object associated with the cell A1.

Consequently, once modified, the expression species "GOOG.close," where close is a parameter of the data object "GOOG."

The expression, after being processed by the dependency resolution logic 208, is transmitted to the application server 106, where the evaluation logic 114 evaluates the expression. The result of the evaluation is a value associated with the cell into which the expression was input. The value is displayed via the UI logic 202. Each time a primary cell into which the expression was input is modified, or a secondary cell on which the primary cell is dependent is modified, the value may be updated accordingly.

Figure 3:
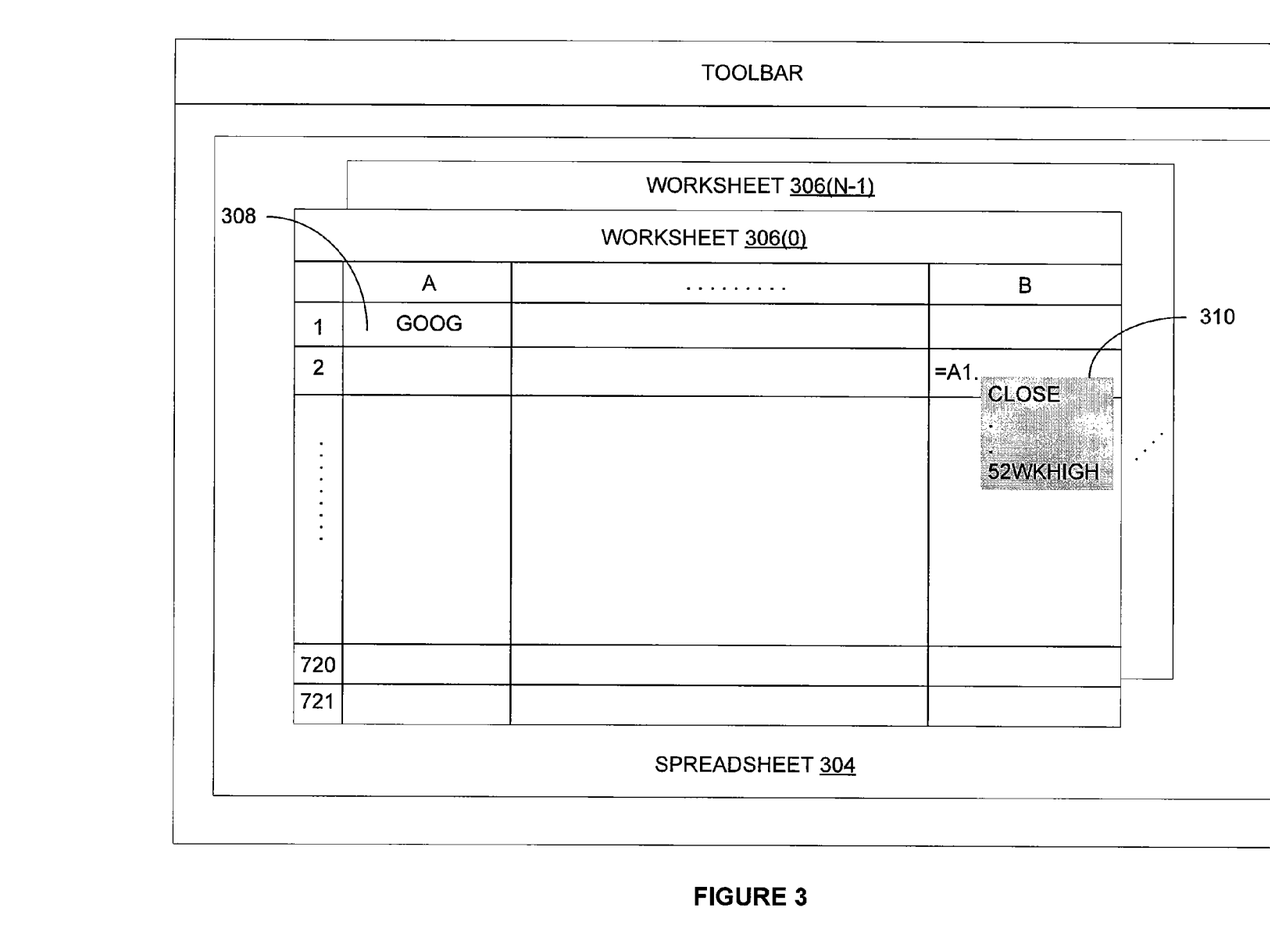
FIG. 3 is a conceptual illustration of a worksheet included in the spreadsheet application that references a rich object, according to one embodiment of the invention.

FIG. 3 is a conceptual illustration of a spreadsheet 304 included in the spreadsheet application 102 that references a data object, according to one embodiment of the invention. As shown, the spreadsheet 304 includes multiple worksheets 306. Worksheet 306(0) has rows defined by numerical identifiers and columns defined by alphabetical identifiers. Each cell of worksheet 306(0) is identified by a particular cell reference that includes the column and the row intersection at which the cell resides. For example, cell 308 is identified by the cell reference "A1." As also shown, the cell 308 includes a reference to the data object "GOOG."

Further, the user inputs a portion of an expression, "A1" into the cell associated with the cell reference "B2." The portion of the expression is captured by the input capture logic 204 and transmitted to the auto-complete logic 206 for providing suggestions to complete the expression based on the input. As previously described herein, the auto-complete logic 206 is configured to identify that the cell A1 is associated with the data object "GOOG" and provide parameters in the dialog box 310, such as variables and functions, related to the data object as suggestions to the user.

Figure 4:
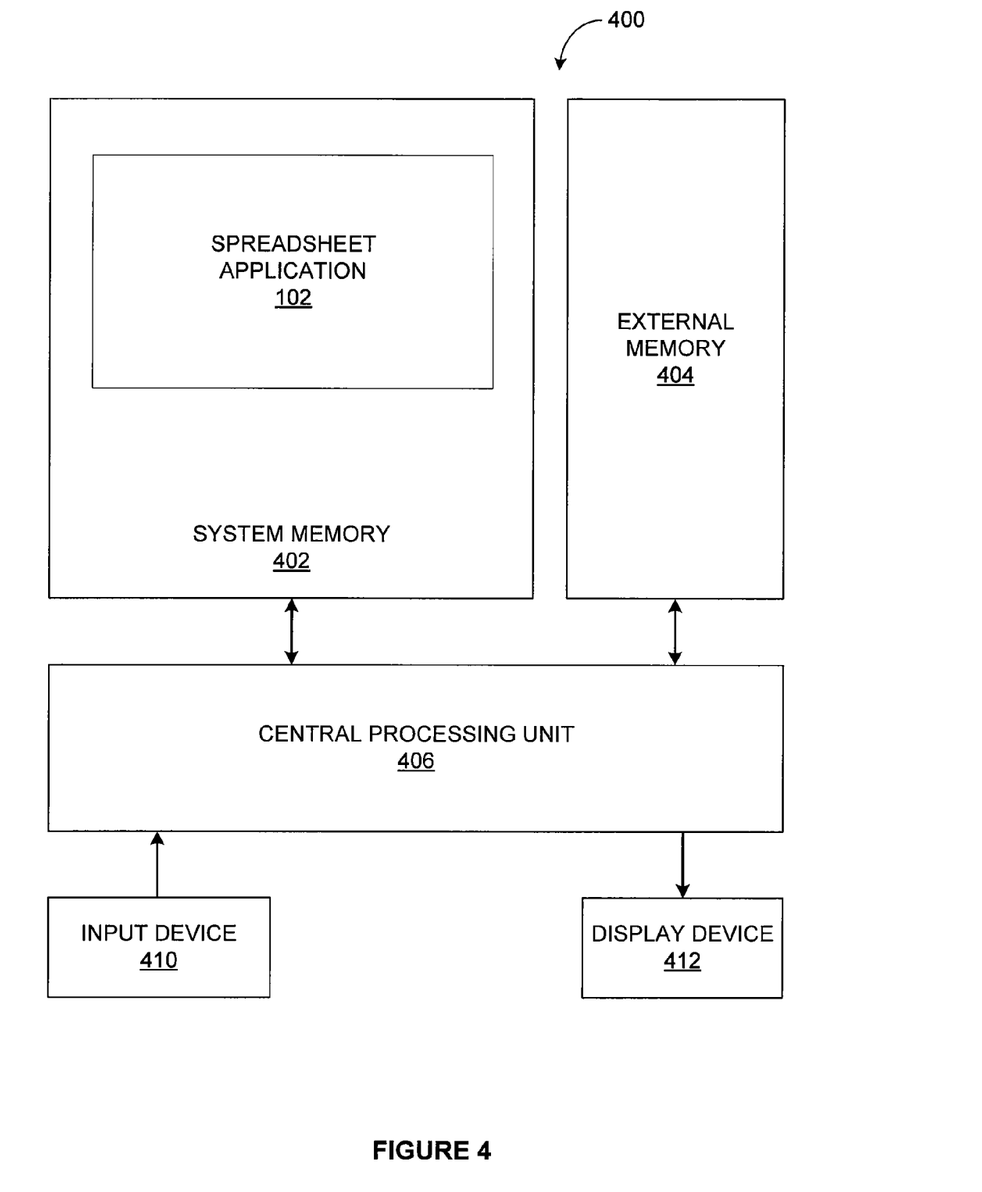
FIG. 4 is an exemplary system within which the spreadsheet application of FIG. 1 could execute, according to one embodiment of the invention.

FIG. 4 is an exemplary system within which the spreadsheet application 102 of FIG. 1 could execute, according to one embodiment of the invention. As shown, the system 400 includes a system memory 402, an external memory 404, a central processing unit (CPU) 406, an input device 410 and an display device 412.

The system memory 402 includes the spreadsheet application 102 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the video conferencing application 112. The input device 410 is an end-user controlled input device, e.g. a mouse or keyboard, that allows a user to manipulate various aspects of the spreadsheet application 102 including the UI logic 202. The display device 412 may be a cathode-ray tube (CRT), a liquid crystal display (LCD) or any other type of display device.

Figure 5A:
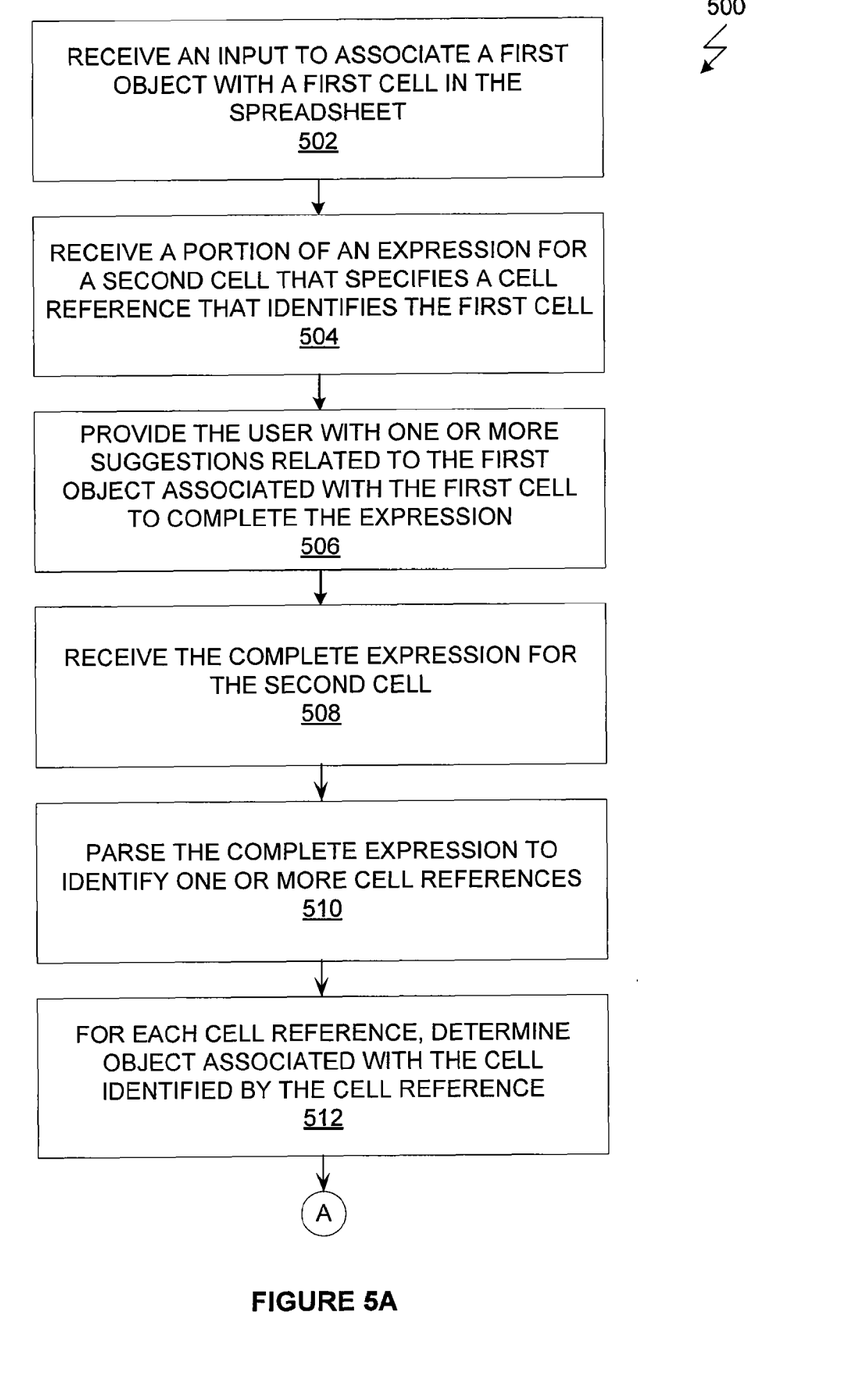
FIGS. 5A and 5B set forth a flow diagram of method steps for referencing a rich object from within a spreadsheet application, according to one embodiment of the invention.
Figure 5B:
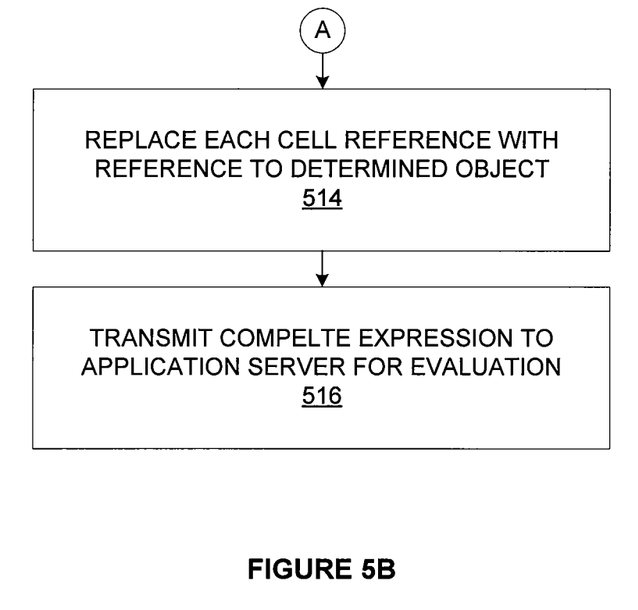

FIGS. 5A and 5B set forth a flow diagram of method steps for referencing a data object from within a spreadsheet application, according to one embodiment of the invention. Although the method steps are described in conjunction with the system for FIG. 1-4, persons skilled in the art will understand that any system configured to perform the method steps, in any order, is within the scope of the invention.

The method 500 begins at step 502, where the input capture logic 204 receives included in the spreadsheet application 102 receives an input to associate a first data object, such as the data object "GOOG", with a first cell included in a spreadsheet.

At step 504, the input capture logic 204 receives input that includes a portion of an expression being input into a second cell of the spreadsheet. The portion of the expression includes, at least, a cell reference that identifies the first cell. At step 506, the portion of the expression is transmitted to the auto-complete logic 206 that provides the user with one or more suggestions related to the first object associated with the first cell that is identified by the cell reference included in the portion of the expression. For example, as shown in FIG. 3, the suggestions include one or more parameters related to the "GOOG" data object.

At step 508, the input capture logic 204 receives the complete expression that was input into the second cell and transmits the complete expression to the dependency resolution logic 208. At step 510, the dependency resolution logic 208 parses the complete expression to identify one or more cell references specified by the expression. At step 512, the dependency resolution logic 208 determines, for each cell reference included in the expression, the data object associated with the cell that is identified by the cell reference. At step 514, the dependency resolution logic 208 replaces each cell reference with a reference to the data object identified at step 514.

At step 516, the dependency resolution logic 208 transmits the modified expression to the application server 106 for evaluation, where a value for the second cell is determined and transmitted back to the spreadsheet application 102 for display.

Advantageously, being able to access and analyze data objects related to financial data from within a spreadsheet application enables users to perform complex data entry and analysis operations in an efficient manner.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

I claim:

1. A method for providing access to a data object from within a spreadsheet included in a spreadsheet application, the method comprising:

receiving a user input from a first cell of the spreadsheet via a service logic;

transmitting the user input, from the service logic to an input receiving logic in a server, for evaluating the user input with a plurality of data objects in an object model, and returning a data object from the plurality of data objects;

using a first computer, associating the data object with the first cell of the spreadsheet, wherein the data object has one or more parameters, and the first cell is identified by a first cell reference in a computer display device coupled to the first computer;

receiving a first input for a second cell of the spreadsheet, wherein the first input includes a portion of an expression and includes the first cell reference identifying the first cell;

in response to receiving the first input, retrieving the one or more parameters associated with the data object of the first cell as suggestions, and causing displaying the one or more suggested parameters in association with the second cell;

receiving a second input indicating that a particular suggestion was selected from the one or more suggested parameters;

associating the particular suggestion with the second cell in the portion of the expression;

replacing the first cell reference specified in the expression in the second cell with a reference to the data object associated with the first cell;

based on the expression comprising the reference to the data object and the particular suggestion, determining a value by querying a database at a second computer to obtain the value for the particular suggestion in relation to the data object and causing displaying the value in the second cell.

2. The method of claim 1, wherein, prior to providing the one or more suggested parameters, establishing that the first cell reference specified by the portion of the expression identifies the first cell, the first cell is associated with the data object, and that the data object is related to the one or more suggested parameters.

3. The method of claim 1, further comprising, prior to replacing the first cell reference, performing a collision check to confirm that the particular suggestion, in fact, specifies the first cell reference as opposed to a different type of reference having the same text as the first cell reference.

4. The method of claim 3, wherein performing the collision check comprises determining that the particular suggestion is not associated with metadata indicating that the particular suggestion specifies a different type of expression having the same text as the first cell reference.

5. The method of claim 1, wherein associating the data object with the first cell comprises storing a first object reference corresponding to the data object in the first cell.

6. The method of claim 1, wherein, once the value for the second cell is determined, each time the parameter related to the data object is updated, the value for the second cell is also updated.

7. The method of claim 1, wherein, once the value for the second cell is determined, each time the first cell is updated, the value for the second cell is also updated.

8. The method of claim 1, wherein the data object represents a type of financial instrument associated with an entity traded in a financial market.

9. A non-transitory computer-readable medium storing instructions that, when executed by a processor, cause the processor to provide access to a data object from within a spreadsheet included in a spreadsheet application, by performing the steps of:

receiving a user input from a first cell of the spreadsheet via a service logic;

transmitting the user input, from the service logic to an input receiving logic in a server, for evaluating the user input with a plurality of data objects in an object model, and returning a data object from the plurality of data objects;

associating, using a first computer, the data object with the first cell of the spreadsheet, wherein the data object has one or more parameters, and the first cell is identified by a first cell reference in a computer display device coupled to the first computer;

receiving a first input for a second cell of the spreadsheet, wherein the first input includes a portion of an expression and includes the first cell reference identifying the first cell;

in response to receiving the first input, retrieving the one or more parameters associated with the data object of the first cell as suggestions, and causing displaying the one or more suggested parameters in association with the second cell;

receiving a second input indicating that a particular suggestion was selected from the one or more suggested parameters;

associating the particular suggestion with the second cell in the portion of the expression;

replacing the first cell reference specified in the expression in the second cell with a reference to the data object associated with the first cell;

based on the expression comprising the reference to the data object and the particular suggestion, determining a value by querying a database at a second computer to obtain the value for the particular suggestion in relation to the data object and causing displaying the value in the second cell.

10. The method of claim 1, further comprising causing to replace the particular suggestion in the second cell with the value.

11. The method of claim 1, wherein the particular suggestion specifies a call to the database containing trading data of a financial market.

12. The non-transitory computer-readable medium of claim 9, wherein, prior to providing the one or more suggested parameters, establishing that the first cell reference specified by the portion of the expression identifies the first cell, the first cell is associated with the data object, and that the data object is related to the one or more suggested parameters.

13. The non-transitory computer-readable medium of claim 9, further comprising, prior to replacing the first cell reference, performing a collision check to confirm that the particular suggestion, in fact, specifies the first cell reference as opposed to a different type of reference having the same text as the first cell reference.

14. The non-transitory computer-readable medium of claim 13, wherein performing the collision check comprises determining that the particular suggestion is not associated with metadata indicating that the particular suggestion specifies a different type of expression having the same text as the first cell reference.

15. The non-transitory computer-readable medium of claim 9, wherein associating the data object with the first cell comprises storing a first object reference corresponding to the data object in the first cell.

16. The non-transitory computer-readable medium of claim 9, wherein, once the value for the second cell is determined, each time the parameter related to the data object is updated, the value for the second cell is also updated.

17. The non-transitory computer-readable medium of claim 9, wherein, once the value for the second cell is determined, each time the first cell is updated, the value for the second cell is also updated.

18. The non-transitory computer-readable medium of claim 9, wherein the data object represents a type of financial instrument associated with an entity traded in a financial market.

19. The non-transitory computer-readable medium of claim 9, further storing additional instructions which, when executed cause replacing the particular suggestion in the second cell with the value.

20. The non-transitory computer-readable medium of claim 9, wherein the particular suggestion specifies a call to the database containing trading data of a financial market.

21. A computer system, comprising:

a first computing device that includes a memory and a processor configured to:

receive a user input from a first cell of a spreadsheet via a service logic;

transmit the user input, from the service logic to an input receiving logic in a server, for evaluating the user input with a plurality of data objects in an object model, and return a data object from the plurality of data objects;

associate the data object with the first cell of the spreadsheet, wherein the data object has one or more parameters, and the first cell is identified by a first cell reference in a computer display device coupled to the first computer;

receive a first input for a second cell of the spreadsheet, wherein the first input includes a portion of an expression and includes the first cell reference identifying the first cell;

in response to receiving the first input, retrieve the one or more parameters associated with the data object of the first cell as suggestions, and cause displaying the one or more suggested parameters in association with the second cell;

receive a second input indicating that a particular suggestion was selected from the one or more suggested parameters;

associate the particular suggestion with the second cell in the portion of the expression;

replace the first cell reference specified in the expression in the second cell with a reference to the data object associated with the first cell;

based on the expression comprising the reference to the data object and the particular suggestion, determine a value by querying a database at a second computer to obtain the value for the particular suggestion in relation to the data object and cause displaying the value in the second cell.

22. The computer system of claim 21, wherein the processor is further configured to cause replacing the particular suggestion in the second cell with the value.

23. The computer system of claim 21, wherein the particular suggestion specifies a call to the database containing trading data of a financial market.

* * * * *